US008449279B2

(12) United States Patent
Nakai et al.

(10) Patent No.: US 8,449,279 B2
(45) Date of Patent: May 28, 2013

(54) HOT ISOSTATIC PRESSING DEVICE

(75) Inventors: Tomomitsu Nakai, Takasago (JP); Makoto Yoneda, Takasago (JP); Shigeo Kofune, Takasago (JP); Katsumi Watanabe, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 338 days.

(21) Appl. No.: 12/917,922

(22) Filed: Nov. 2, 2010

(65) Prior Publication Data

US 2011/0165283 A1 Jul. 7, 2011

(30) Foreign Application Priority Data

Nov. 20, 2009 (JP) ................................. 2009-265282
Apr. 6, 2010 (JP) ................................. 2010-087840

(51) Int. Cl.
*B29C 43/10* (2006.01)
*B22F 3/15* (2006.01)

(52) U.S. Cl.
USPC .......... 425/78; 425/405.1; 425/815; 432/199; 219/400

(58) Field of Classification Search
USPC .............. 425/405.2, 815, 73–74, 77–78, 210; 432/199, 205, 233, 249; 219/400
See application file for complete search history.

(56) References Cited

U.S. PATENT DOCUMENTS

| | | | | |
|---|---|---|---|---|
| 4,532,984 | A * | 8/1985 | Smith, Jr. | 165/61 |
| 4,602,769 | A | 7/1986 | Crum | |
| 5,251,880 | A | 10/1993 | Ishii et al. | |
| 6,514,066 | B1 | 2/2003 | Bergman | |
| 6,837,086 | B2 | 1/2005 | Manabe et al. | |
| 7,008,210 | B2 | 3/2006 | Manabe et al. | |
| 7,011,510 | B2 | 3/2006 | Nakai et al. | |
| 2007/0228596 | A1 | 10/2007 | Fujikawa et al. | |
| 2011/0008741 | A1 | 1/2011 | Gardin | |

FOREIGN PATENT DOCUMENTS

| | | |
|---|---|---|
| JP | 63-123999 U | 8/1988 |
| JP | 3-34638 | 7/1991 |
| JP | 2007-309626 | 11/2007 |
| WO | WO 2009/076973 A1 | 6/2009 |

OTHER PUBLICATIONS

Extended Search Report issued Jun. 19, 2012 in European Patent Application No. 10190602.2-1253.

* cited by examiner

*Primary Examiner* — Richard Crispino
*Assistant Examiner* — Thukhanh Nguyen
(74) *Attorney, Agent, or Firm* — Oblon, Spivak, McClelland, Maier & Neustadt, L.L.P.

(57) ABSTRACT

A hot isostatic pressing device according to the present invention includes an inner casing, an outer casing, and a heating means which are provided inside a high-pressure container. The device further includes a first cooling means for forcedly circulating pressure medium gas in such a manner that pressure medium gas guided upwardly between the inner casing and the outer casing is guided to the outside of the outer casing through an upper part of the outer casing, cooled while being guided downwardly along an inner circumferential surface of the high-pressure container, and then returned to between the inner casing and the outer casing through a lower part of the outer casing; and a second cooling means for guiding pressure medium gas within a hot zone formed inside the inner casing to the outside of the hot zone, cooling the pressure medium gas guided to the outside by merging it with the pressure medium gas forcedly circulated by the first cooling means, and returning the cooled pressure medium gas into the hot zone. According to such a structure, a high cooling efficiency can be attained while maintaining the hot zone in a thermally uniform condition.

12 Claims, 8 Drawing Sheets

(COOLING OF MODE A)
COOLING BY MEANS OF NATURAL CONVECTION (COOLING OF MODE B)
COOLING BY MEANS OF FORCED CONVECTION (COOLING OF MODE C)
FORCED CONVECTION + DIRECT INTRODUCTION
OF LOW-TEMPERATURE PRESSURE MEDIUM GAS

HOT ISOSTATIC PRESSING DEVICE

BACKGROUND OF THE INVENTION

1. Field of the Invention

The present invention relates to a hot isostatic pressing device.

2. Description of the Related Art

An HIP process (a pressing method using a hot isostatic pressing device) for treating a workpiece such as a sintered product (ceramics, etc.) or cast product at a high temperature equal to or higher than recrystallization temperature thereof under a high-pressure pressure medium gas atmosphere of several tens to several hundreds MPa is characterized by that residual pores in the workpiece can be extinguished. Therefore, this HIP process is confirmed to have effects such as improvement in mechanical characteristics, reduction in dispersion of characteristics, and improvement in yield, and thus has come to be extensively used for industrial purposes.

Now, in the actual industrial production site, speeding-up of the treatment is strongly desired, and it is essentially required for this to perform a cooling step that takes the longest time particularly among the steps of the HIP process in a short time. Therefore, with respect to conventional hot isostatic pressing devices (hereinafter referred to as HIP devices), various techniques are proposed to improve the cooling rate while maintaining the inside of a furnace in a thermally uniform condition.

For example, Japanese Examined Utility Model Application Publication No. 3-34638 discloses an HIP device in which the inside of a high-pressure container for storing a workpiece is divided into two chambers by providing a heat insulating layer and a casing inside the high-pressure container, and the inside that is isolated thermally and air-tightly by the heat-insulating layer and the casing is defined as a hot zone (furnace chamber) for performing isostatic pressing treatment. A fan for agitation of furnace chamber internal gas and a fan for forced circulation of cooling gas are provided for the inside and outside of the hot zone respectively, so that pressure medium gas can be circulated individually inside and outside the hot zone. Since the pressure medium gases circulating respectively inside and outside the hot zone can be mutually heat-exchanged through the casing, the hot zone can be efficiently cooled by transferring the heat within the hot zone to the casing by the inside circulating flow, and then discharging it out of the high-pressure container through a container wall thereof by the outside circulating flow from the casing.

On the other hand, U.S. Pat. No. 6,514,066 discloses an HIP device including a heat-insulating layer provided inside a high-pressure container, similarly to Japanese Examined Utility Model Application Publication No. 3-34648. The HIP device of U.S. Pat. No. 6,514,066 is differed from that of Japanese Examined Utility Model Application Publication No. 3-34638 in that this HIP device is provided with three ejectors for supplying the pressure medium gas. Namely, the first ejector of the three ejectors sends pressure medium gas which is cooled by circulating outside the heat insulating layer to the second ejector, and the third ejector sends pressure medium gas higher in temperature than that in the first ejector that circulates outside the heat insulating layer to the second ejector. The second ejector mixes the pressure medium gases with different temperatures sent from the first and third ejectors together, and directly supplies the resulting pressure medium gas which is temperature-adjusted by the mixing into the hot zone, whereby the hot zone is efficiently cooled.

The HIP device of Japanese Examined Utility Model Application Publication No. 3-34638 has a structure capable of easily maintaining the hot zone in a thermally uniform condition since the hot zone is isolated thermally and air-tightly by the heat insulating layer and the casing. However, this device has a limitation in enhancement of cooling efficiency since the heat-insulating layer inhibits the heat within the hot zone from moving out of the high-pressure container when cooling the hot zone. Particularly, when the temperature in the hot zone drops to about 300° C., the cooling efficiency can be seriously deteriorated, resulting in a prolonged cooling time.

On the other hand, the HIP device of U.S. Pat. No. 6,514,066 can maintain high cooling efficiency since the cooled pressure medium is directly supplied to the hot zone, differed from that of Japanese Examined Utility Model Application Publication No. 3-34638, and also can maintain the hot zone in a thermally uniform condition since the temperature of pressure medium gas to be supplied to the hot zone can be adjusted by the second ejector. In this HIP device, however, it can hardly be expected to enhance the flow of pressure medium gas circulating outside the heat insulating layer by the intake air by the first ejector since the intake port of the first ejector is provided in a position distant from the flow of pressure medium gas circulating outside the heat insulating layer. Namely, the flow rate of the pressure medium gas circulating outside the heat insulating layer cannot be raised much since this pressure medium gas merely circulates by natural convection. Therefore, it takes a lot of time to transfer the heat in the hot zone to the high-pressure container, and it is impossible to maximize the cooling effect.

SUMMARY OF THE INVENTION

From the viewpoint of the above-mentioned problems, it is an object of the present invention to provide an HIP device, capable of efficiently cooling the inside of a treatment chamber (hot zone) in a short time after HIP treatment.

To solve the problems, the HIP device according to the prevent invention includes the following technical means.

The HIP device of the present invention comprises: a gas-impermeable inner casing disposed inside a high-pressure container for storing a workpiece so as to surround the workpiece; a gas-impermeable outer casing disposed so as to surround the inner casing from the outside; and a heating means provided inside the inner casing to form a hot zone around the workpiece, and performs isostatic pressing treatment to the workpiece using pressure medium gas within the hot zone kept adiabatically by the inner casing and the outer casing, wherein the pressure medium gas within the hot zone can be cooled by use of a first cooling means and a second cooling means described below.

The first cooling means is configured to forcedly circulate pressure medium gas in such a manner that pressure medium gas guided upwardly between the inner casing and the outer casing is guided to the outside of the outer casing through an upper part of the outer casing, the guided pressure medium gas is cooled while being guided downwardly along an inner circumferential surface of the high-pressure container, and the cooled pressure medium gas is returned to between the inner casing and the outer casing through a lower part of the outer casing.

The second cooling means is configured to circulate pressure medium gas in such a manner that the pressure medium gas within the hot zone is guided to the outside of the hot zone, the pressure medium gas guided to the outside is cooled by merging it with the pressure medium gas forcedly circulated by the first cooling means, and a part of the cooled pressure medium gas is returned into the hot zone through the lower side of the hot zone.

According to this, the cooling capability of the first cooling means can be enhanced since the pressure medium gas is forcedly circulated while contacting with the inner circumferential surface of the high-pressure container in the first cooling means. On the other hand, in the second cooling means, the heat from the hot zone can efficiently be released out of the high-pressure container since a part of the pressure medium gas with high temperature within the hot zone is merged with the first cooling means and cooled by use of the first cooling means enhanced in cooling capability by the forced circulation. In addition, the hot zone can efficiently be cooled since the part of the pressure medium gas merged with the first cooling means is directly sent into the hot zone after cooled.

Concretely, such a first cooling means can include: an upper opening part formed in the upper part of the outer casing to guide the pressure medium gas between the inner casing and the outer casing to the outside of the outer casing; a first valve means provided between the high-pressure container and the outer casing to interrupt circulation of the pressure medium gas outflowing through the upper opening part and flowing between the high-pressure container and the outer casing; a lower opening part formed in the lower part of the outer casing to return the cooled pressure medium gas to between the inner casing and the outer casing; and a forced circulation means for forcedly circulating the pressure medium gas.

The first valve means may be configured so that the circulation of the pressure medium gas flowing between the high-pressure container and the outer casing can be interrupted by opening and closing the upper opening part.

The second cooling means can include: a first circulation port formed in the inner casing to merge the pressure medium gas contacted by the heating means with the pressure medium gas circulated by the first cooling means; a second circulation port formed on the lower side of the inner casing to return a part of the cooled pressure medium gas to the hot zone side; and a second valve means for opening and closing the second circulation port.

When the second cooling means includes a partition plate disposed between the workpiece and the heating means so as to surround the workpiece, a structure such that the pressure medium gas guided to between the inner casing and the partition plate is returned to the hot zone side while guiding the pressure medium gas guided to between the inner casing and the partition wall downwardly to the first circulation port can be also adopted.

In this case, the second cooling means may include a gas flow amplification means for mixing the pressure medium gas guided to between the inner casing and the partition plate with the cooled pressure medium guided through the second circulation port in a predetermined mixing ratio and blowing the mixed pressure medium gas into the hot zone.

In addition, the first cooling means may include: an upper opening part formed in an upper part of the outer casing to guide the pressure medium gas between the inner casing and the outer casing to the outside of the outer casing; a lower opening part formed in a lower part of the outer casing to return the cooled pressure medium gas to between the inner casing and the outer casing; a first valve means provided at the upper opening part to interrupt circulation of the pressure medium gas flowing between the high-pressure container and the outer casing; and a casing-side forced circulation means provided at the lower opening part to forcedly return the cooled pressure medium gas to between the inner casing and the outer casing.

Alternatively, the first cooling means may include the upper opening part; the lower opening part; a first valve means provided at the lower opening part to interrupt circulation of the pressure medium gas flowing between the high-pressure container and the outer casing; and a casing-side forced circulation means provided at the upper opening part to forcedly return the cooled pressure medium gas to between the inner casing and the outer casing.

The second cooling means preferably includes a first circulation port formed in the inner casing to merge the pressure medium gas contacted by the heating means with the pressure medium gas circulated by the first cooling means; a second circulation port formed on the lower side of the inner casing to return a part of the cooled pressure medium gas to the hot zone side; and a hot zone-side forced circulation means provided at the second circulation port to forcedly return the cooled pressure medium gas to the hot zone side through the second circulation port.

In the above-mentioned case, preferably, the second cooling means includes a partition plate disposed between the workpiece and the heating means so as to surround the workpiece, and is configured so as to return the pressure medium gas guided to between the inner casing and the partition plate upwardly to the hot zone side and to send the pressure medium gas guided to between the inner casing and the partition plate to the first circulation port. In addition, the second cooling means preferably includes a gas flow amplification means for mixing the pressure medium gas guided to between the heating means and the partition plate with the cooled pressure medium gas guided through the second circulation port in a predetermined mixing ratio and blowing the mixed pressure medium gas into the hot zone.

Furthermore, the HIP device of the present invention, which comprises a gas-impermeable inner casing disposed inside a high-pressure container for storing a workpiece so as to surround the workpiece; a gas-impermeable outer casing disposed so as to surround the inner casing from the outside; and a heating means provided inside the inner casing to form a hot zone around the workpiece, and which performs isostatic pressing treatment to the workpiece using pressure medium gas within the hot zone kept adiabatically by the inner casing and the outer casing, may comprise an upper opening part formed in an upper part of the outer casing to guide pressure medium gas between the inner casing and the outer casing to the outside of the outer casing; a first valve means for interrupting circulation of the pressure medium gas guided to the outside through the upper opening part and formed between the high-pressure container and the outer casing; a lower opening part formed in a lower part of the outer casing to return the pressure medium gas cooled by contacting with an inner circumferential surface of the high-pressure container to between the inner casing and the outer casing; a first circulation port for guiding the pressure medium gas within the hot zone to between the heating means and the inner casing, guiding the guided pressure medium gas downwardly while bringing it into contact with the heating means, and merging the guided pressure medium gas with the pressure medium gas circulating between the inner casing and the outer casing; a second circulation port formed on the lower side of the inner casing to return a part of the cooled pressure medium gas to the hot zone side; and a second valve means for guiding the cooled pressure medium gas into the hot zone to cool the hot zone by opening and closing the second circulation port.

According to the HIP device of the present invention, the inside of the treatment chamber (hot zone) can be efficiently cooled in a short time after HIP treatment.

DETAILED DESCRIPTION OF THE PREFERRED EMBODIMENT

First Embodiment

A first embodiment of a hot isostatic pressing device according to the present invention will be described in detail in reference to the drawings.

Figure 1:
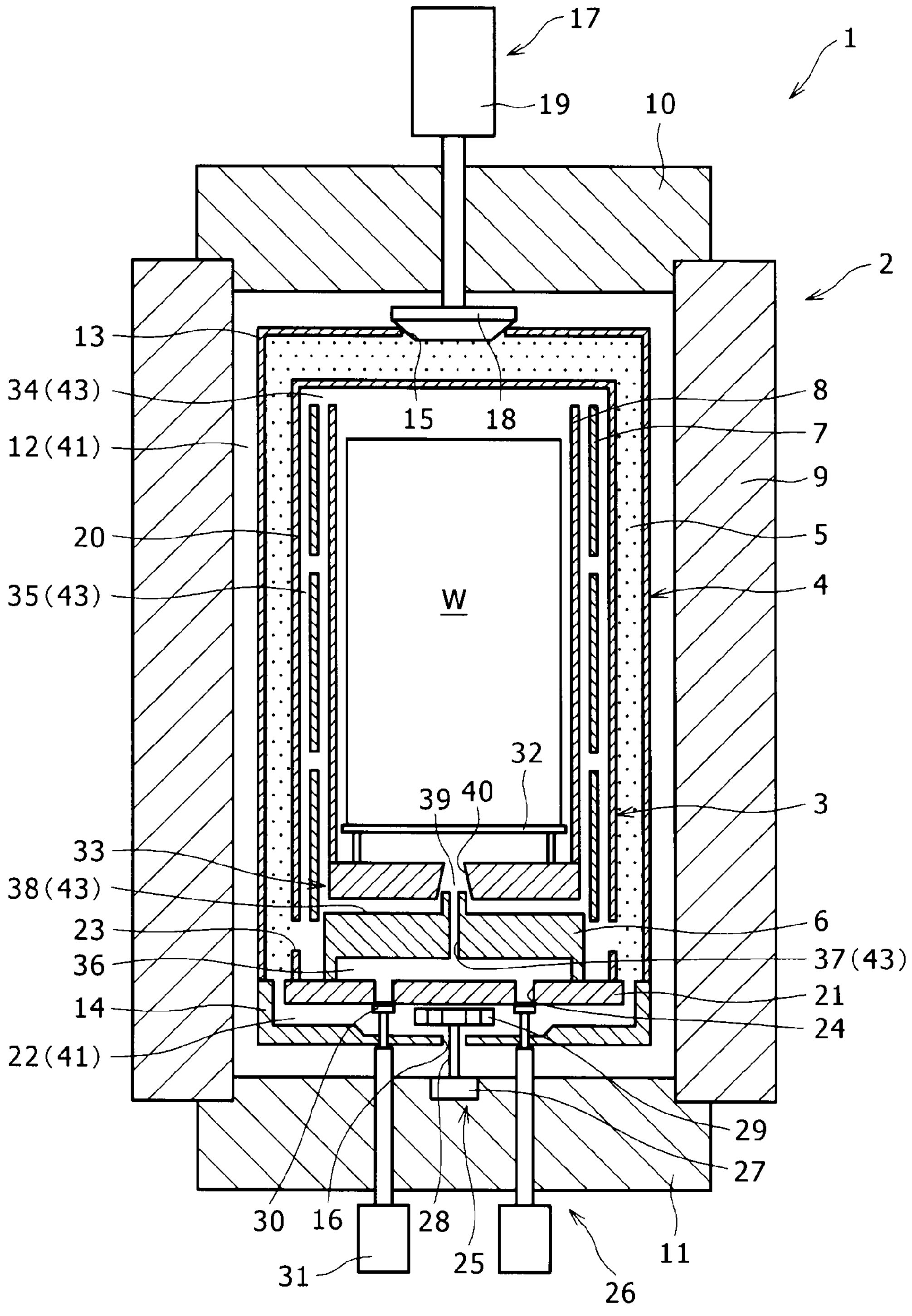
FIG. 1 is a front view of an HIP device according to a first embodiment of the present invention.

FIG. 1 shows a hot isostatic pressing device (hereinafter referred to as HIP device 1) of the first embodiment. The HIP device 1 has a high-pressure container 2 for storing a workpiece W. And a gas-impermeable inner casing 3 disposed so as to surround the workpiece W and a gas-impermeable outer casing 4 disposed so as to surround the inner casing 3 from the outside are provided inside the high-pressure container 2. A heat-insulating layer 5 is provided between the inner casing 3 and the outer casing 4, the heat-insulating layer 5 adiabatically isolating the inside of the inner casing 3 from the outside.

The HIP device 1 also includes a support base 6 for supporting the workpiece W and a heating means 7 for heating pressure medium gas, which are provided inside the inner casing 3, and a partition plate 8 provided on the upper side of the support base 6 to mutually partition the heating means 7 and the workpiece W. In the HIP device 1, hot isostatic pressing treatment (hereinafter referred to as HIP treatment) can be performed to the workpiece W in a hot zone by supplying the pressure medium gas heated by the heating means 7 provided outside the partition plate 8 to the inside of the partition plate 8 to form the hot zone so as to surround the workpiece W.

Each member constituting the HIP device 1 will be described in detail below.

As shown in FIG. 1, the high-pressure container 2 includes a container body 9 formed in a cylindrical shape around an axis along the vertical direction; a lid body 10 closing an opening on the upper side (the upper side in paper surface of FIG. 1) of the container body 9; and a bottom body 11 closing an opening on the lower side (the lower side in paper surface of FIG. 1) of the container body 9, and internally has a hollow space formed by combining these members through seals not shown. A supply pipe and a discharge pipe (not shown) are connected to the high-pressure container 2, so that high-temperature, high-pressure pressure medium gas (argon gas or nitrogen gas raised in pressure to about 10 to 300 MPa to enable HIP treatment) can be supplied to and discharged from the container through these pipes. The outer casing 4 is built in the high-pressure container 2.

The outer casing 4 is a casing formed in a substantially columnar shape around an axis along the vertical direction, and is disposed inside the high-pressure container 2 with a distance from the inner circumferential surface of the high-pressure container 2 so that an outside flow passage 12 capable of circulating pressure medium gas along the vertical direction can be formed between the outer casing 4 and the inner circumferential surface of the high-pressure container 2. The outside flow passage 12 includes a first valve means 17 for interrupting circulation of the pressure medium gas flowing through the outside flow passage 12.

The outer casing 4 includes a reversed cup-shaped outer casing body 13 opened downwardly and an outer casing bottom body 14 closing the opening of the outer casing 13, and internally has a hollow space. Each of the outer casing body 13 and the outer casing bottom body 14 is formed of a gas-impermeable heat-resisting material such as stainless, nickel alloy, molybdenum alloy or graphite in accordance with the temperature condition of HIP treatment.

An upper opening part 15 is formed in an upper part of the outer casing body 13 so that the pressure medium gas on the inside of the outer casing 4 can be guided upwardly to the outside of the outer casing 4. In addition, a lower opening part 16 is formed in a lower part of the outer casing 4, similarly to the upper opening part 15, to circulate the pressure medium gas on the outside of the outer casing 4 to the inside along the vertical direction. The first valve means 17 is provided at the upper opening part 15 to ensure the circulation of pressure medium gas by opening and closing the upper opening part 15.

The first valve means 17 includes a plug member 18 formed in a size sufficient to close the upper opening part 15 of the outer casing 4, and a moving means 19 for moving the plug member 18 in the vertical direction. The first valve means 17 can optionally switch the circulation of pressure medium gas and the interruption thereof by moving the plug member 18 either upwardly or downwardly by use of the moving means provided outside the high-pressure container 2 to open or close the upper opening part 15.

The inner casing 3 is a casing disposed inside the outer casing 4, which is formed in a substantially columnar shape around an axis along the vertical direction. The inner casing 3 is spaced radially-inward from the inner circumferential surface of the outer casing 4 so that a gap can be formed between the inner casing 3 and the outer casing 4. A gas-permeable heat-insulating layer 5 formed of a porous material such as carbon fiber-woven graphite material or ceramic fiber is disposed in this gap. An inside flow passage 22 capable of circulating pressure medium gas along the vertical direction through the heat-insulating layer 5 is formed.

The inner casing 3 includes a reversed cup-shaped inner casing body 20 and an inner casing bottom body 21 closing its opening, which are formed using the same heat-insulating material as the outer casing 4. A first circulation port 23 is formed in a lower part of the inner casing body 20 to circulate the pressure medium gas on the inside of the inner casing 3 to the outside (the inside flow passage 22), and a second circulation port 24 is formed in the inner casing bottom body 21 to cause a part of the pressure medium gas circulating through the inside flow passage 22 to flow to the inside of the inner casing 3. A forced circulation means 25 is provided on the lower opening part 16 where this inside flow passage 22 intersects the above-mentioned outside flow passage 12, and a second valve means 26 is provided at the second circulation port 24 to adjust the flow rate of pressure medium gas to be returned into the hot zone by opening and closing the second circulation port 24.

The forced circulation means 25 is provided extending over the outside flow passage 12 and the inside flow passage 22 to forcedly circulate the pressure medium gas through these flow passages. In this embodiment, the forced circulation means 25 is provided at the lower opening part 16 where the inside flow passage 22 intersects the outside flow passage 12 as described above. The forced circulation means 25 includes a motor 27 provided on the bottom body 11 of the high-pressure container 2, a shaft part 28 extending upwardly from the motor 27 through the lower opening part 16, and an agitating blade 29 attached to the tip of the shaft part 28. The agitating blade 29 is provided in a position corresponding to the lower opening part 16 in the inside flow passage 22 so that a flow directed from bottom to up can be generated in the pressure medium gas. Therefore, since the pressure medium gas in the outside flow passage 12 is forcedly carried to the inside flow passage 22 through the lower opening part 16 when the agitating blade 29 is rotated by the motor 27, the circulation quantity of pressure medium gas passing through the outside flow passage 12 and the inside flow passage 22 can be increased.

A second valve means 26 which is provided on a lower part of the inner casing 3 is configured to return a part of the pressure medium gas passing through the inside flow passage 22 into the hot zone by opening and closing the second circulation port 24 provided within the inner casing 3. The second valve means 26 includes a plug member 30 formed in a size sufficient to close the second circulation port 24 formed in the inner casing bottom body 21, and a moving means 31 for moving the plug member 30 in the vertical direction. The second valve means 26 can adjust the flow rate of the pressure medium gas to be returned into the hot zone through the second circulation port 24, similarly to the first valve means 17, by moving the plug member 30 downwardly by use of the moving means 31.

The support base 6 for supporting the workpiece W within the hot zone is disposed inside the inner casing 3 and on the upper side of the inner casing bottom body 21 so as to contact with the upper surface of the inner casing bottom body 21. The support base 6 includes a product frame 32 provided on the upper center so that the workpiece W can be placed thereon, and a partition plate 8 provided along the vertical direction so as to entirely surround the circumference of the product frame 32. In addition, a gas flow amplification means 33 for mixing the pressure medium gas circulating inside the inner casing 3 with the pressure medium gas circulating outside the inner casing 3 is provided within the support base 6.

The partition plate 8 provided on the upper side of the support base 6 is formed in a cylindrical shape by use of a gas-impermeable sheet material, with its upper end extending to slightly below the upper surface of the inner casing 3. Namely, a gap 34 is formed between the upper end of the partition plate 8 and the inner casing 3 to circulate pressure medium gas inwardly and outwardly, and the pressure medium gas on the inside of the partition plate 8 can move to the outside of the partition plate 8 through this gap 34.

The heating means 7 provided outside the partition plate 8 is composed of three heaters aligned in the vertical direction. The heating means 7 is spaced radially from both the inner circumferential surface of the inner casing 3 and the partition plate 8 to form gas circulation paths 35 for circulating pressure medium gas downwardly on both the inside and outside of the heating means 7. The gas circulation path 35 on the outside of the heating means 7 communicates with the above-mentioned first circulation port 23 of the inner casing 3 to guide the pressure medium gas within the hot zone to the outside flow passage 12 through the first circulation port 23. The gas flow passage 35 on the inside of the heating means 7 communicates with the gas flow amplification means 33 to circulate the pressure medium gas within the hot zone.

The gas flow amplification means 33 is provided on the support base 6, and is configured to guide low-temperature pressure medium gas flowing along the inside flow passage 22 through the second circulation port 24, to mix this low-temperature pressure medium gas with high-temperature pressure medium gas circulating within the hot zone, and to return the resulting pressure medium gas to the hot zone. The gas flow amplification means 33 provided on the support base 6 includes a gas storage part 36 for storing the pressure medium gas inflowing through the second circulation port 24; a first gas leading path 37 for guiding the pressure medium gas in the gas storage part 36 to the inside of the support base 6; a second gas leading path 38 for guiding the pressure medium gas flowing through the gas circulation path 35 on the inside of the heating means 7 to the inside of the support base 6; a mixing chamber 39 for mixing the pressure medium gases carried respectively through the first gas leading path 37 and the second gas leading path 38; and a tapered nozzle part 40 for blowing the pressure medium gas mixed in the mixing chamber 39 into the hot zone.

The gas storage part 36 is a space formed between the inner casing bottom body 21 and the lower surface of the support base 6 formed to be recessed upwardly (in a nozzle shape), and can temporarily store the pressure medium gas flowing along the inside flow passage 22 through the second circulation port 24. The pressure medium gas in the gas storage part 36 is sent to the mixing chamber 39 formed within the support base 6 through the first gas leading path 37 formed along the vertical direction within the support base 6. On the other hand, the pressure medium gas in the gas circulation path 35 on the inside of the heating means 7 is guided to the lower side of the hot zone through this gas circulation path 35, and then introduced into the mixing chamber 39 through the second gas leading path 38 formed so as to extend through the support base 6 along the horizontal direction.

The mixing chamber 39 is formed within the support base 6, and configured so that pressure medium gases differed in temperature which are sent respectively through the first gas leading path 37 and the second gas leading path 38 can be mixed together, and the temperature of pressure medium gas can be thus adjusted by mixing high-temperature pressure medium gas circulating within the hot zone with low-temperature pressure medium gas cooled by the first cooling means which will be described later in a desired mixing ratio.

In the thus-constituted mixing chamber 39, the low-temperature pressure medium gas is in an expanded state by being heated by the mixing with the high-temperature pressure medium gas, and atomized when supplied into the hot zone through the tapered nozzle part 40 provided above the mixing chamber 39. Therefore, the pressure medium gas within the hot zone can be forcedly agitated by use of the pressure medium gas injected through the nozzle part 40.

The HIP device 1 of the present invention having the structure described so far for performing HIP treatment to the workpiece W in a uniform thermal state adopts a characteristic cooling method in cooling of the hot zone to take out the workpiece W after HIP treatment.

The cooling method will be then described.

First, the HIP device 1 of the present invention has a first annular flow passage 41 (first cooling means) for performing cooling by circulating pressure medium gas in such a manner that the pressure medium gas guided upwardly along the inside flow passage 22 formed between the outer casing 4 and the inner casing 3 is guided to the outside flow passage 12 through the upper opening part 15 of the outer casing 4, the guided pressure medium gas is cooled by bringing it into contact with the high-pressure container 2 while guiding it downwardly along the outside flow passage 12, and the cooled pressure medium gas is returned to the inside flow passage 22 through the lower opening part 16 of the outer casing 4.

The HIP device 1 has, in addition to the first annular flow passage 41, a second annular flow passage 43 (second cooling means) for performing cooling by circulating pressure medium gas in such a manner that the pressure medium gas within the hot zone is guided to the outside of the hot zone, the pressure medium gas guided to the outside is cooled by merging it with the pressure medium gas circulated by the above-mentioned first annular flow passage 41 (first cooling means), and a part of the cooled pressure medium gas is returned to the hot zone from under the hot zone.

The method for cooling the hot zone using the first annular flow passage 41 and/or the second annular flow passage 43 (the first cooling means and/or the second cooling means) is as follows.

As shown in FIG. 1, when HIP treatment is performed in the HIP device 1 having the above-mentioned structure, the first valve means 17 is set to a closed state to regulate the circulation of pressure medium gas to the outside flow passage 12 through the upper opening part 15. When the pressure medium gas is heated by the heating means 7 in this state, the pressure medium gas within the hot zone surrounded by the heat-insulating layer 5 is heated, whereby HIP treatment can be performed to the workpiece W in a thermally uniform condition.

After the HIP treatment is performed to the workpiece W in this way, the hot zone must be cooled to take out the workpiece W. The cooling of the hot zone is a step which requires the longest time in the HIP treatment process, and it is preferred to enhance the cooling efficiency as much as possible to enable the cooling of the hot zone in a short time. As the method for rapidly cooling the hot zone in this way, cooling modes such as Mode A to Mode C as described below can be taken.

Figure 2:
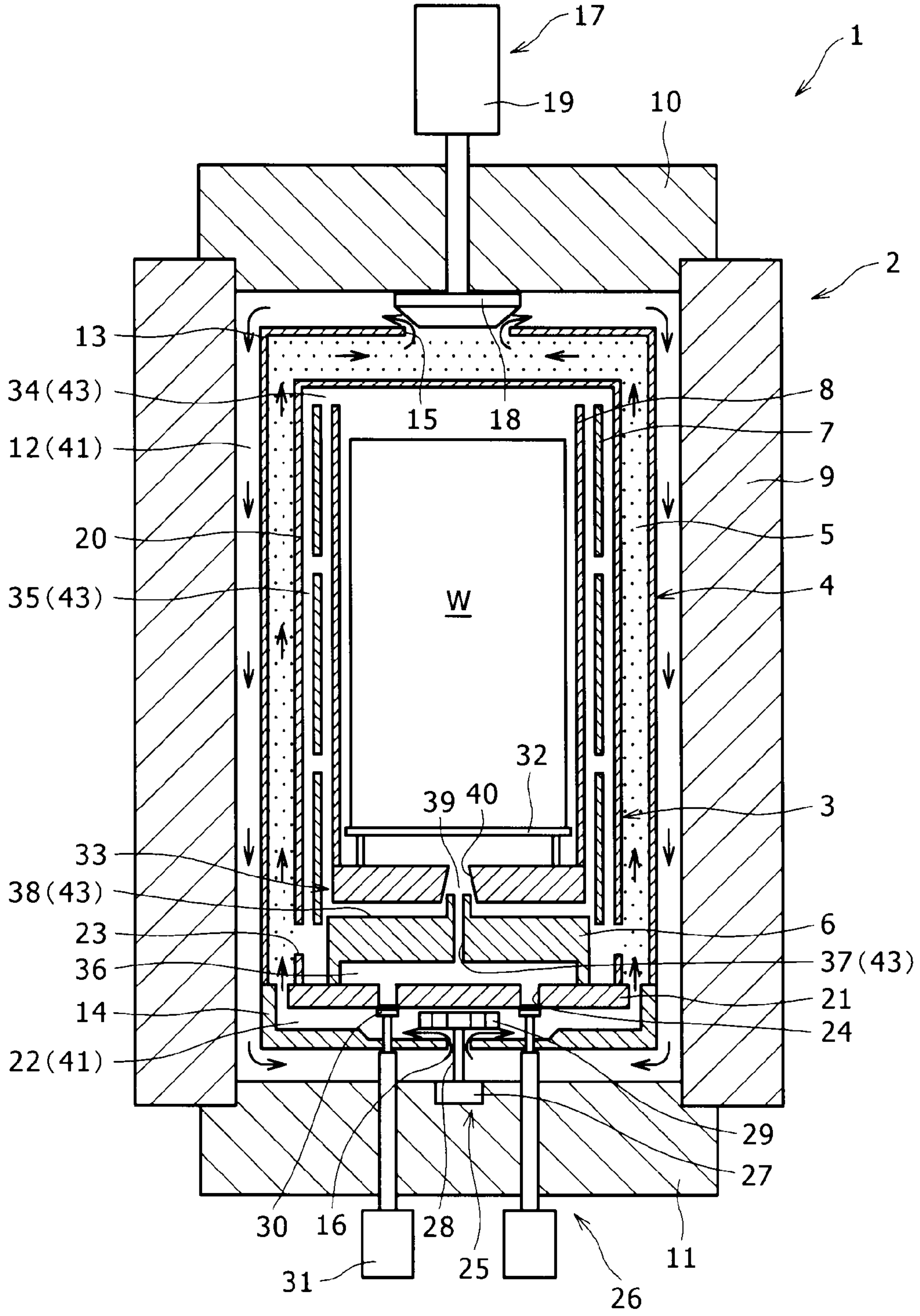
FIG. 2 is a front view of the HIP device of the first embodiment, in which cooling of Mode A is performed.

In a cooling method of Mode A shown in FIG. 2, cooling is performed by means of natural convection of pressure medium through the above-mentioned first annular flow passage 41.

Namely, in the HIP device 1 shown in FIG. 1, the upper opening part 15 is set to an opened state by use of the first valve means 17 to allow circulation of pressure medium gas between the inside flow passage 22 and the outside flow passage 12.

As a result, the pressure medium in the inside flow passage 22 moves upwardly within the inside flow passage 22, since it is situated closer to the hot zone than that in the outside flow passage 12 with higher temperature, reaches the upper opening part 15 located on the upper side of the inside flow passage 22, and moves to the outside flow passage 12 through the upper opening part 15. The pressure medium gas thus moved to the outside flow passage 12 moves downwardly along the outside flow passage 12, since it is cooled by the contact with the inner circumferential surface of the high-pressure container 2 and reduced in temperature, and reaches the lower side of the outside flow passage 12. The pressure medium gas moved to the lower side of the outside flow passage 12 returns to the inside flow passage 22 through the lower opening part 16, and circulates successively through the outside flow passage 12 and the inside flow passage 22, whereby the cooling of the hot zone is promoted.

In the cooling method of Mode A in which the cooling of pressure medium gas is performed by natural convection as described above, the circulation quantity (flow velocity) of pressure medium gas cannot be increased so much because of the natural convection, or a high cooling effect cannot be expected. However, a certain level of cooling effect can be expected while the hot zone is in a high-temperature state, for example, just after HIP treatment, since the temperature difference from the outside of the high-pressure container 2 is large.

Figure 3:
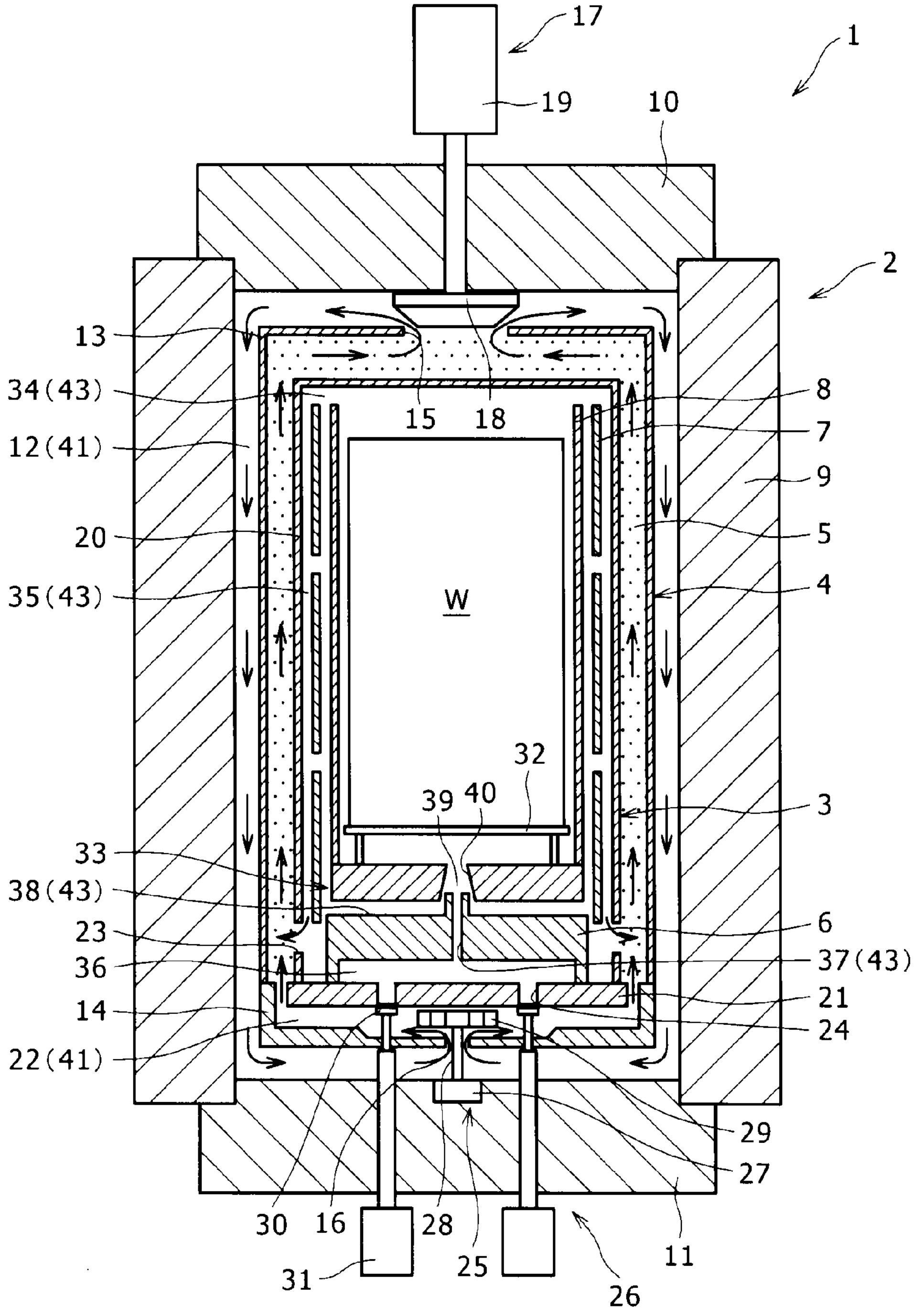
FIG. 3 is a front view of the HIP device of the first embodiment, in which cooling of Mode B is performed.

On the other hand, in a cooling method of Mode B shown in FIG. 3, cooling is performed by forced convection of pressure medium through the above-mentioned annular flow passage 41 by the forced circulation means 25, and this method is differed from the cooling method of Mode A in that the circulation quantity of pressure medium gas is increased by the forced circulation.

Namely, when the pressure medium gas flowing through the outside flow passage 12 is forcedly pulled into the inside flow passage 22 using the forced circulation means 25 composed of the agitating blade 29 provided on the upper side of the lower opening part 16, the flow of pressure medium gas in the outside flow passage 12 and the flow of pressure medium in the inside flow passage 22 are enhanced in response thereto. Thus, the circulation quantity of pressure medium gas can be increased more than in Mode A even when the same circulation path as in Mode A is used, and the cooling effect can be encouraged more than in Mode A.

However, in the above-mentioned cooling methods of Mode A and Mode B, the pressure medium gas hardly moves out of the hot zone since the inside of the hot zone remains isolated thermally by the heat-insulating layer 5. Therefore, if the temperature particularly in the hot zone drops to 300° C. or lower, the cooling effect can hardly be expected, and a long time is required for the cooling.

Figure 4:
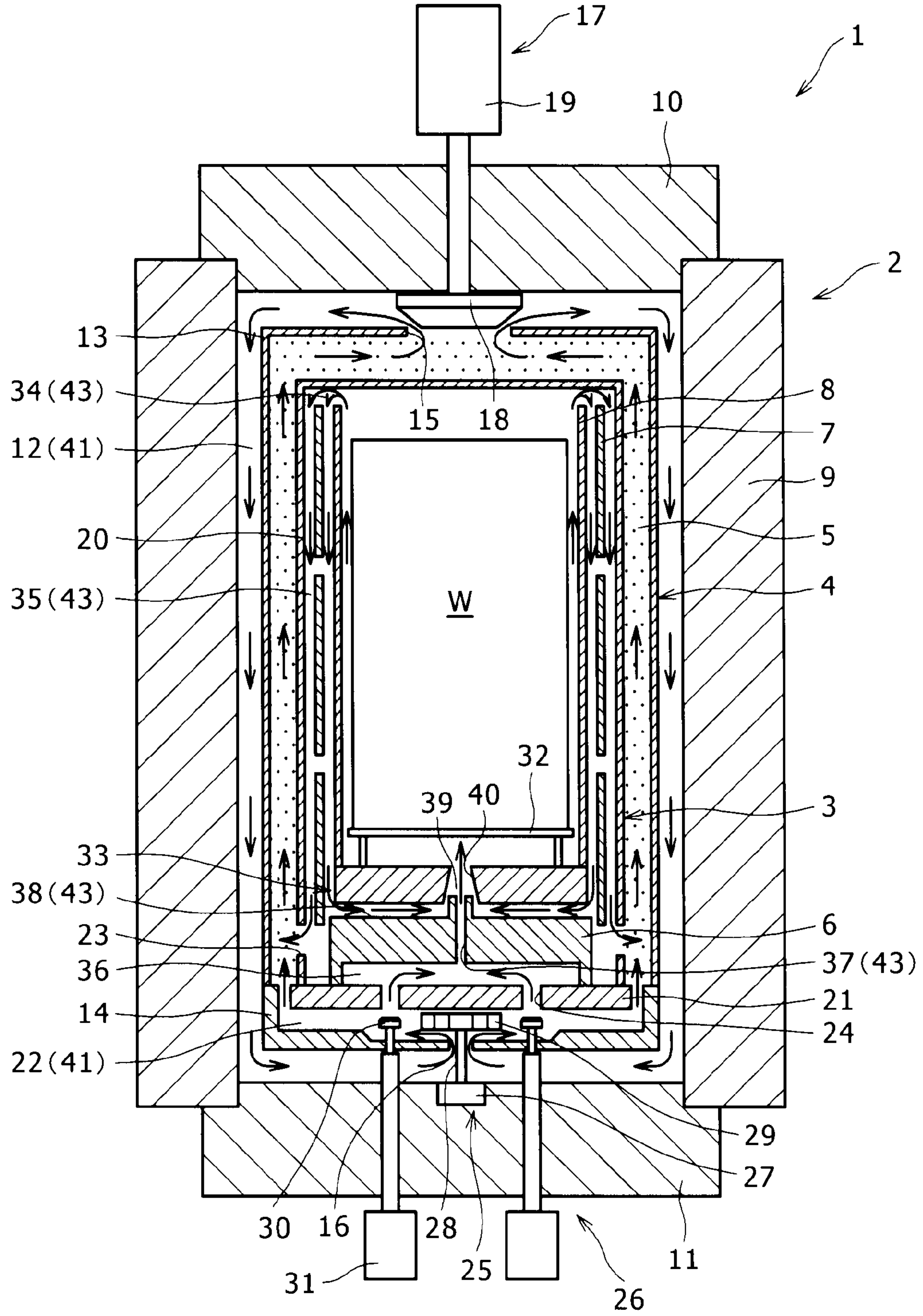
FIG. 4 is a front view of the HIP device of the first embodiment, in which cooling of Mode C is performed.

Therefore, the HIP device 1 of the present invention is configured so that a cooling method of Mode C shown in FIG. 4 can be carried out also by use of both the first annular flow passage 41 and the second annular flow passage 43 (by use of the second cooling means in addition to the first cooling means).

Namely, in the cooling method of Mode C, the upper opening part 15 is set to an opened state by use of the first valve means 17, and the second circulation port 24 is set also in an opened state by use of the second valve means 26. When the agitating blade 29 of the forced circulation means 25 is rotated in this state, pressure medium gas is forcedly circulated along the first annular flow passage 41 in the same manner as in Mode B, whereby the cooling is performed.

At that time, the pressure medium gas within the hot zone is moved to the outside of the hot zone through the vertical gap 34 formed between the partition plate 8 and the inner casing 3 at the upper end of the partition plate 8, and branched into two flows above the heating means 7 to flow respectively along the inner surface side and the outer surface side of the heating means 7 in the radially outward direction.

The pressure medium gas flowing to the outer surface side of the heating means 7 is moved downwardly and merged with the pressure medium gas flowing along the inside flow passage 22 through the first circulation port 23. This pressure medium gas is cooled while passing through the upper opening part 15 and the outside flow passage 12 along the first annular flow passage 41, and returned to the inside flow passage 12 through the lower opening part 16 by the forced circulation means 25. The pressure medium gas thus returned to the inside flow passage 22 is guided to the gas storage part 36 of the gas flow amplification means 33 through the second circulation port 24 which is laid in the opened state.

On the other hand, the pressure medium gas flowing to the inner surface side of the heating means 7 is also moved downwardly and guided to the second gas leading path 38 of the gas flow amplification means 33 from the lower side of the hot zone. In the gas flow amplification means 33, the pressure medium gases branched above the heating means 7 are mixed together and returned to the hot zone. At that time, although the pressure medium gas circulating through the inner surface side of the heating means 7 is hardly cooled, the pressure medium gas circulating through the outside gas circulation path 35 is reduced in temperature since it is sufficiently cooled by the first annular flow passage 41. Therefore, the temperature of the pressure medium gas to be returned to the hot zone can be adjusted by mixing both the pressure medium gases in the mixing chamber.

In this way, the hot zone is cooled by use of the cooling of Mode C or the first annular flow passage 41 (the first cooling means) and the second annular flow passage 43 (the second cooling means), whereby the hot zone can be efficiently cooled while preventing nonuniform cooling of the hot zone.

Namely, the flow rate of the pressure medium gas passing through the second circulation port 24 is adjusted using the second valve means 26 to change the ratio of the circulation quantity of pressure medium gas to be cooled through the first annular flow passage 41 to the circulation quantity of pressure medium gas to be circulated through the second annular flow passage 43, whereby the discharge quantity of heat to be discharged out of the high-pressure container 2 by the first annular flow passage 41 and the discharge quantity of heat to be discharged out of the high-pressure container 2 by the second annular flow passage 43 can be balanced.

For example, the heat quantity to be discharged is limited even if the heat can be discharged out of the high-pressure container 2 through the inner circumferential surface of the high-pressure container 2 by heat exchange. The dischargeable heat quantity varies depending on the structure or cooling condition of the HIP device 1, the temperature of the hot zone which changes with the progress of cooling, and the like. However, if the discharge quantities of heat in the first annular flow passage 41 and the second annular flow passages 43 can be balanced, optimum cooling can be performed according to the cooling condition, variations of the temperature of the hot zone, and the like, and the inside of the hot zone (the treatment chamber) can be cooled in an extremely short time.

By using the second valve means 26, the flow rate of low-temperature pressure medium gas to be supplied to the gas flow amplification means 33 through the second circulation port 24 can be adjusted, and the temperature of pressure medium gas to be mixed by the gas flow amplification means 33 can be also adjusted. Consequently, sudden change in temperature of the hot zone due to inflow of a large amount of low-temperature medium gas to the hot zone can be prevented, and the high-pressure container 2 or the heating means 7 can be thus prevented from being broken by such a sudden temperature change.

Second Embodiment

A second embodiment of the HIP device 1 of the present invention will be then described in detail in reference to the drawings.

Figure 5:
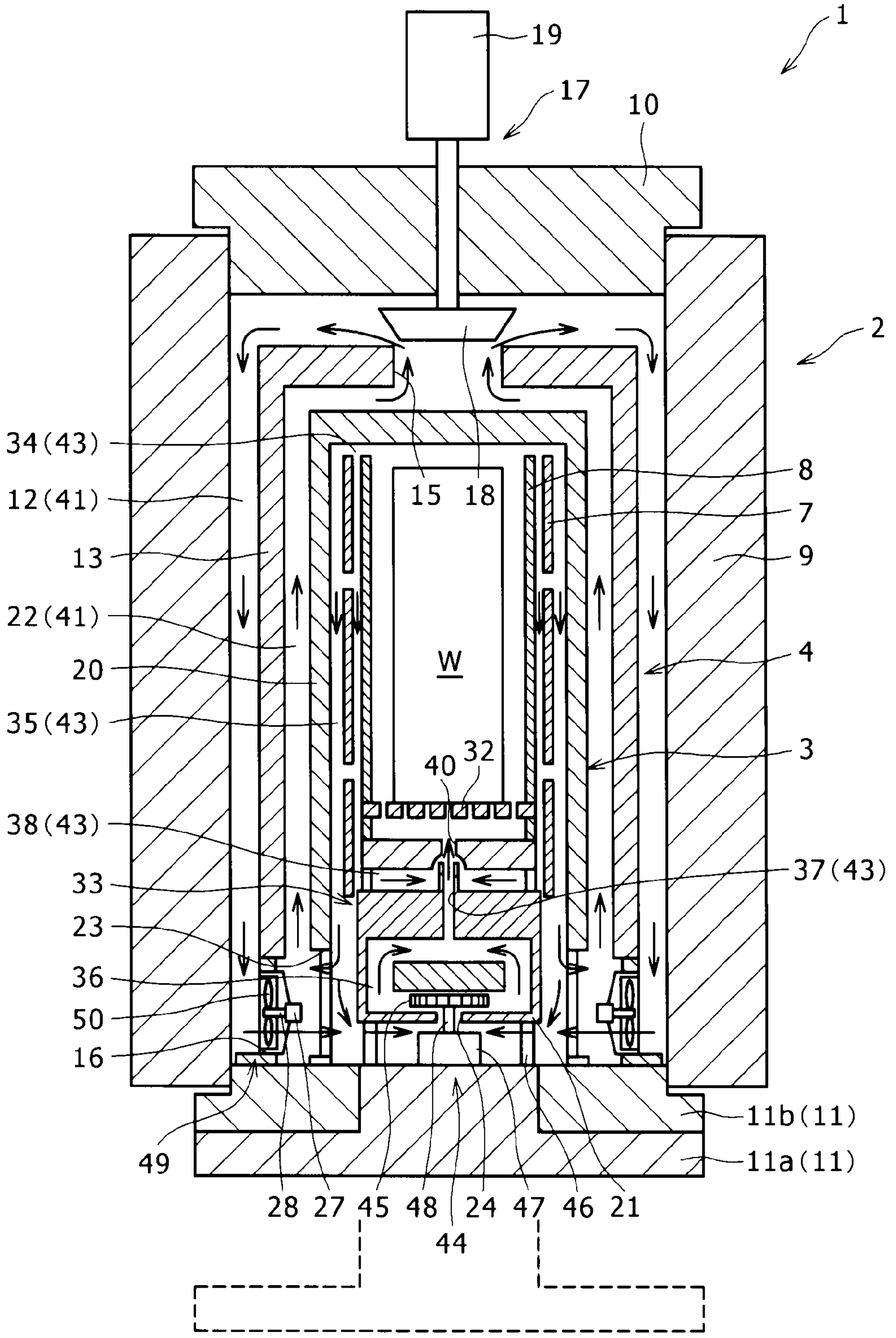
FIG. 5 is a front view of an HIP device according to a second embodiment of the present invention, in which cooling of Mode C is performed.

FIG. 5 shows a hot isostatic pressing device of the second embodiment. As shown in FIG. 5, the HIP device 1 of the second embodiment includes casing-side forced circulation means 49 instead of the above-mentioned forced circulation means 25, and a hot zone-side forced circulation means 44 instead of the second valve means 26.

The structure of the HIP device 1 of the second embodiment is described in detail below.

The HIP device 1 of the second embodiment comprises, similarly to the first embodiment, an inner casing 3, an outer casing 4, a heating means 7, an upper opening part 15, a first valve means 17, lower opening parts 16, a first circulation port 23, and a second circulation port 24.

The lower opening parts 16 are formed in a lower part of the outer casing 4 to circulate the pressure medium gas situated on the outside of the outer casing 4 to the inside of the outer casing 4. The outer casing 4 with the lower opening parts 16 formed therein is formed in a reversed cup shape opened downwardly similar to the first embodiment, but the reversed cup is free from a bottom body (the outer casing bottom body 14), differed from the first embodiment. The lower end of the outer casing 4 is extended downwardly until it contacts with the bottom body 11 of the high-pressure container 2, and the above-mentioned lower opening parts 16 are formed on the outer circumferential wall of the outer casing 4 slightly higher in level than the bottom body 11 of the high-pressure container 2 so as to radially extend through the outer circumferential wall. The lower opening parts 16 are formed at a plurality of positions (two positions in the example of the drawing) around the axis of the high-pressure container 2 (in the circumferential direction), and each of the plurality of lower opening parts 16 includes the casing-side forced circulation means 49.

The casing-side forced circulation means 49 are provided in a plurality of positions in the circumferential direction (around the axis of the high-pressure container 2) so as to correspond with the lower opening parts 16, and include agitating blades 50 rotatable around a horizontal axis along the radial direction, and pressure medium gas can be forcedly introduced from the outside of the outer casing 4 to the inside through the lower opening parts 16 by use of the agitating blades 50.

A part of the pressure medium gas introduced to the inside of the outer casing 4 by use of the casing-side forced circulation means 49 flows to between the inner casing 3 and the outer casing 4 (the first annular flow passage 41), and the remainder is guided to the first circulation port 23.

The inner casing 3 of the second embodiment includes, similarly to the first embodiment, an inner casing body 20 and an inner casing bottom body 21, the inner casing bottom body 21 being formed with a diameter smaller than that of the inner casing body 20, differed from the first embodiment, so that a gap capable of distributing pressure medium gas in the radial direction can be formed between the inner casing bottom body 21 and the inner circumferential surface of the inner casing body 20. The lower end of the inner casing body 20 is extended downwardly until it contacts with the bottom body 11 of the high-pressure container 2 similarly to the outer casing 4, and the above-mentioned first circulation port 23 is formed on the outer circumferential wall of the inner casing body 20 slightly higher in level than the bottom body 11.

The first circulation port 23 in the second embodiment is designed not only to guide pressure medium gas on the inside of the inner casing 3 to the outside of the inner casing 3 similarly to the first embodiment, but also to guide pressure medium gas on the outside of the inner casing 3 to the inside of the inner casing 3. The first circulation port 23 is formed vertically long, compared with the first embodiment, so that the pressure medium gas flows toward the inside of the inner casing 3 on the lower side and flows toward the outside on the upper side. The pressure medium gas thus guided through the first circulation port 23 is temporarily stored in a space formed between the inner casing bottom body 21 and the bottom body 11 of the high-pressure container 2.

The inner casing bottom body 21 is vertically spaced from the bottom body 11 of the high-pressure container 2, and installed above the bottom body 11 through a support part 46 provided in an erected state on the bottom body 11 of the high-pressure container 2. A second circulation port 24 for guiding the pressure medium gas temporarily stored in the space between the inner casing bottom body 21 and the bottom body 11 to the inside of the inner casing 3 is formed in the center of the inner casing bottom body 21 so as to vertically extend therethrough.

The second circulation port 24 is a through-hole formed in the center of the inner casing bottom body 21, and the hot zone-side forced circulation means 44 is provided at the second circulation port 24.

The hot zone-side forced circulation means 44 has substantially the same structure as the forced circulation means of the first embodiment, and includes a motor 47 provided on the bottom body 11 of the high-pressure container 2, a shaft part 48 extending upwardly from the motor 47 through the second circulation port 24, and a gas leading fan 45 attached to the tip of the shaft part 48. The hot zone-side forced circulation means 44 is similar in structure to the forced circulation means of the first embodiment, but is largely differed in function from that of the first embodiment in the respect of performing only the circulation of the pressure medium gas flowing into the hot zone through the second circulation port 25. Namely, the hot zone-side forced circulation means 44 is configured so that the rotating speed of the motor 47 can be controlled independently from the casing-side forced circulation means 49 to change the rotating speed of the gas leading fan 45 without being affected by the rotating speed of the agitating blade 50 of the casing-side forced circulation means 49. Thus, only the circulation quantity of the pressure medium gas flowing into the hot zone through the second circulation port 24 can be individually adjusted.

The above-mentioned bottom body 11 of the high-pressure container 2 is composed of two radially combined members, and the radial inside 11*a* of the bottom body 11 can be raised and lowered relative to the radial outside 11*b* thereof. A gas flow amplification means 33, a product frame 32 and a partition plate 8 are provided above the radial inside 11*a* of the bottom body 11 through the support part 46, and the product frame 32 with the workpiece W placed thereon can be pulled down out of the high-pressure container 2 to perform replacement of the workpiece W, maintenance or the like by lowering the radial inside 11*a* of the bottom body 11.

The method of performing cooling after HIP treatment in the HIP device 1 of the second embodiment will be then described.

In the HIP device 1 of the second embodiment, also, the cooling of Mode A is performed by natural convection of pressure medium through the first annular flow passage 41 similarly to the HIP device 1 of the first embodiment. The cooling method of the second embodiment is differed from the first embodiment in the cooling method of Mode B and Mode C.

As shown in FIG. 5, in the cooling method of Mode B, after the upper opening part 15 is opened by use of the first valve means 17 to allow pressure medium gas to circulate between the inside flow passage 22 and the outside flow passage 12, only the casing-side forced circulation means 49 are operated. As a result, the pressure medium gas cooled while moving downwardly along the outside flow passage 12 is forcedly returned to the inside flow passage 22 through the lower opening parts 16 to increase the circulation quantity of the pressure medium gas circulating successively through the outside flow passage 12 and the inside flow passage 22, whereby the cooling of the hot zone is remarkably promoted.

When the hot zone-side forced circulation means 44 is operated further in this cooling of Mode B, the cooling of Mode C is performed as shown below.

First, the pressure medium gas guided to the inside of the inner casing 3 through the second circulation port 24 is stored in the space between the inner casing bottom body 21 and the bottom body 11. When the hot zone-side forced circulation means 44 is operated in this state, the pressure medium gas is forced to flow toward the gas storage part 36 of the gas flow amplification means 33 by the hot zone-side forced circulation means 44, and moved upwardly within the hot zone through the gas flow amplification means 33. The pressure medium gas moved to the upper end of the partition plate 8 is branched into two flows above the heating means 7, and a part of the branched pressure medium gas is moved to the outside of the hot zone through the gap 34, while the remainder is returned to the gas flow amplification means 33.

In the cooling method of Mode C in the second embodiment, the overall circulation quantity of pressure medium gas circulating through the first annular flow passage 41 and the hot zone-side forced circulation means 44 as described above is adjusted by the casing-side forced circulation means 49, and the circulation quantity of pressure medium gas flowing through the second annular flow passage 43 of this overall circulation quantity is adjusted by the hot zone-side forced circulation means 44 independently from the casing-side forced circulation means 49. The HIP device 1 of the second embodiment can achieve the following effects by being provided with such features.

In the process of cooling, the temperature or pressure of pressure medium gas within the hot zone is suddenly changed. To perform the cooling at an optimum cooling rate while the temperature or pressure of pressure medium gas is suddenly changed in this way, it is important to accurately control the circulating flow rate of pressure medium gas flowing through the first annular flow passage 41 or the flow rate of pressure medium gas branched therefrom and introduced into the hot zone.

Namely, since the circulating flow rate of pressure medium gas flowing through the first annular flow passage 41 or the flow rate of pressure medium gas introduced to the hot zone can be adjusted nonsteply and in a wide range of ratio if the hot zone-side forced circulation means 44 and the casing-side forced circulation means 49 can be individually and independently controlled as described above, optimum flow control can be performed over the whole range of the process of cooling.

For example, when the circulation quantity in the second annular flow passage 43 is to be reduced with the circulation quantity in the first annular flow passage 41 being kept large, the HIP device 1 of the first embodiment requires a delicate valve operation such that the second valve means 26 is opened a little with the circulation quantity by the forced circulation means being kept large. However, in the HIP device 1 of the second embodiment, the circulation quantity can be accurately adjusted by an extremely easy operation such that only the rotating speed of the hot zone-side forced circulation means 44 is increased with the circulation quantity by the casing-side forced circulation means 49 being kept large.

Furthermore, when the circulation quantity in the second annular flow passage 43 is to be increased with the circulating quantity in the first annular flow passage 41 being kept small, the adjustment of the circulation quantity may be difficult in the HIP device 1 of the first embodiment in which the circulation quantity in the second annular flow passage 43 is adjusted only by the opening of the valve, but in the HIP device 1 of the second embodiment, the circulation quantity can be increased by a simple operation even in such a case. Thus, the HIP device 1 of the second embodiment is advantageous also in respects of adjustment accuracy and operability.

Third Embodiment

A third embodiment of the HIP device 1 will be then described.

Figure 6:
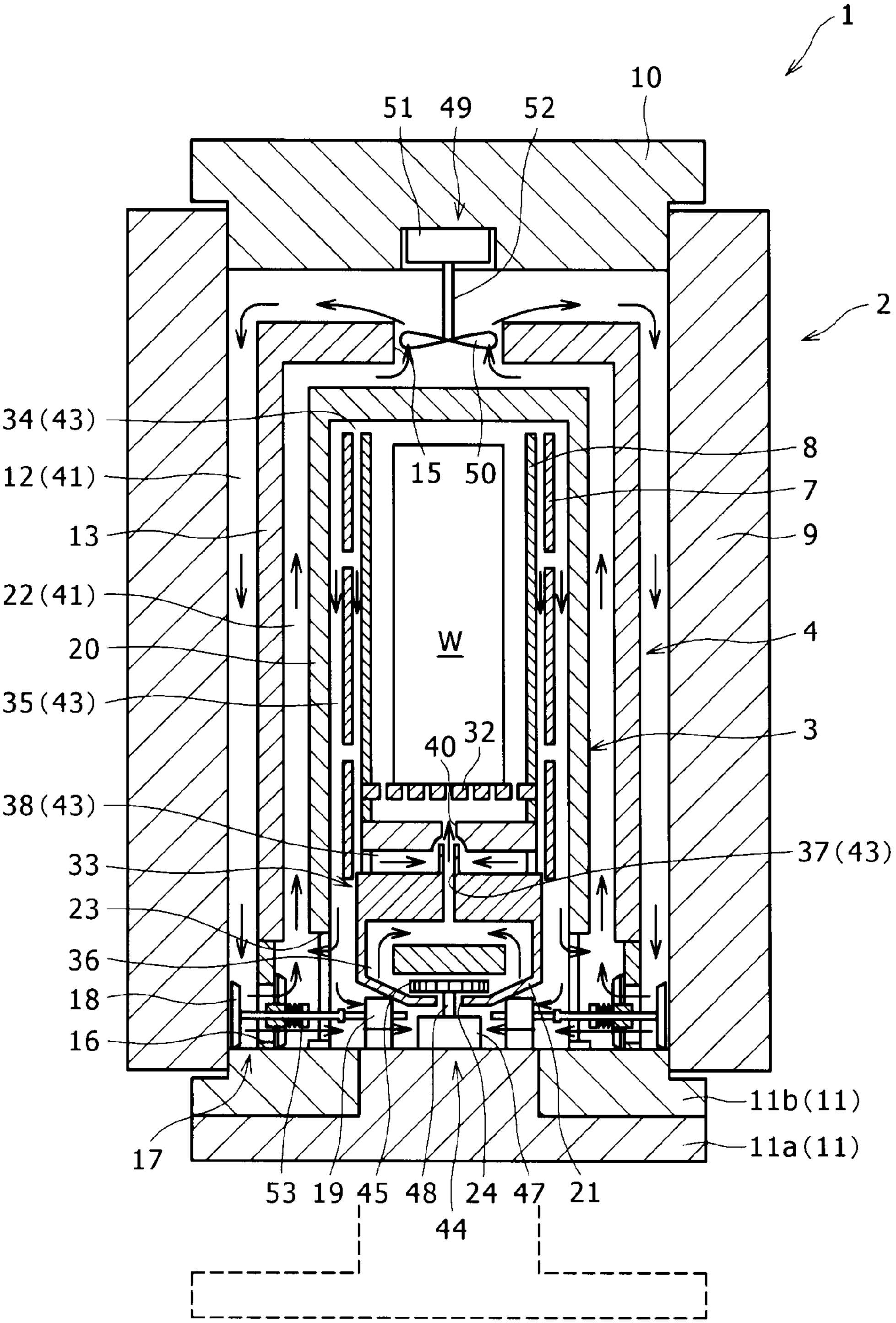
FIG. 6 is a front view of an HIP device according to a third embodiment of the present invention, in which cooling of Mode C is performed.

As shown in FIG. 6, the HIP device 1 of the third embodiment has a structure such that the positions of the first valve means 17 and the casing-side forced circulation means 49 in the HIP device of the second embodiment are interchanged between the upper opening part 15 and the lower opening parts 16. Namely, the HIP device 1 of the third embodiment is configured so that the circulation of the pressure medium gas flowing between the high-pressure container 2 and the outer casing 4 can be interrupted by opening and closing the lower opening parts 16 by the first valve means 17, wherein the casing-side forced circulation means 49 is disposed at the upper opening part 15.

The first valve means 17 in the third embodiment includes a plug member 18 having a rod part horizontally extending in the radial direction and a disk-like part provided on the radially outside end part of the rod part and formed in a size sufficient to close the lower opening parts 16 of the outer casing 4; and a moving means 19 for moving the plug member 18 in the radial direction of the high-pressure container 2, the plug member 18 being radially moved by the moving means 19 to close the lower opening parts 16. A biasing means 53 which exercises a biasing force to the plug member 18 so as to airtighly close the lower opening parts 16 is disposed in the middle of the plug member 18.

On the other hand, the casing-side forced circulation means 49 includes a motor 51 provided on the lid body 10 of the high-pressure container 2; a shaft part 52 extending downwardly from the motor 51 through the upper opening part 15; and an agitating blade 50 attached to the tip (lower end) of the shaft part 52, the agitating blade 50 being rotated by the motor 51, to guide the pressure medium gas on the inside of the outer casing 4 to the outside through the upper opening part 15.

In the HIP device 1 of the third embodiment, also, the cooling of Mode C shown in FIG. 6 and the cooling of Mode B prior to it are performed, and the same effects as in the HIP device of the second embodiment can be attained. In addition to such effects, the HIP device 1 of the third embodiment has a feature in which sealing property is never impaired even after long-time use since the first valve means 17 which is required to have the sealing property is disposed on the lower side of the high-pressure container 2 which is relatively low in temperature.

On the other hand, although the casing-side forced circulation means 49 is disposed on the upper side of the high-pressure container 2 with high temperature, the casing-side forced circulation means 49 is never broken by high temperature since the motor 51 which is particularly weak to high temperature is provided on the lid body 10 of the high-pressure container 2 which is generally water-cooled.

Fourth Embodiment

A fourth embodiment of the HIP device 1 will be then described.

Figure 7:
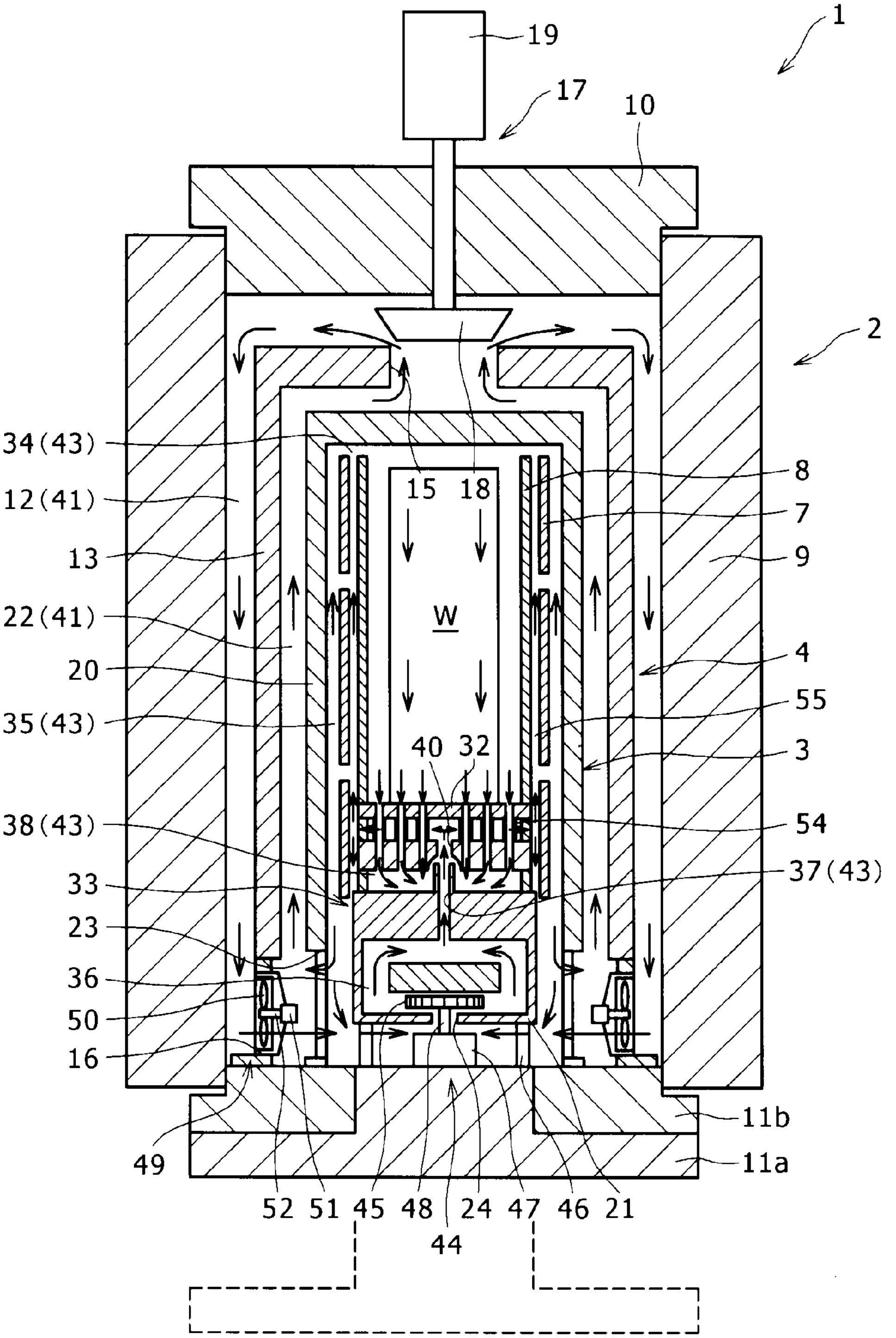
FIG. 7 is a front view of an HIP device according to a fourth embodiment of the present invention, in which cooling of Mode C is performed.
Figure 8:
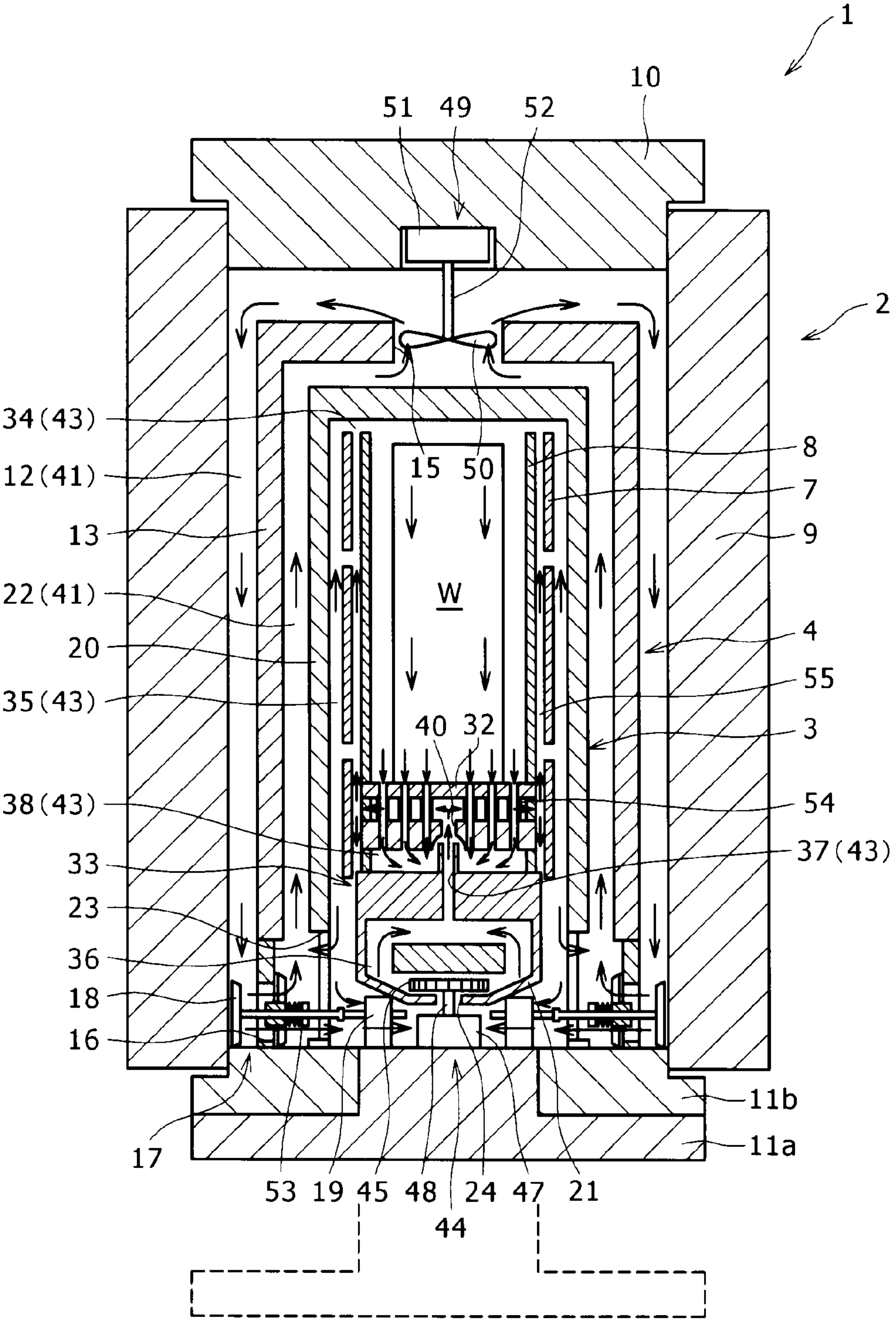
FIG. 8 is a front view showing a modification example of the HIP device of the fourth embodiment, in which cooling of Mode C is performed.

As shown in FIGS. 7 and 8, the HIP device 1 of the fourth embodiment adopts a structure in which the cooled pressure medium gas is guided downwardly within the hot zone in the HIP device 1 of the second embodiment or the third embodiment.

In the HIP device 1 of the fourth embodiment, a gas-circulation pipe 54 extending in the vertical direction, through which pressure medium gas can be circulated, is provided at each of gas circulation holes provided for the product frame 32. The gas circulation pipe 54 has an upper end opened to the upper surface of the product frame 32 and a lower end opened to the second gas leading path 38, so that the pressure medium gas on the upper side of the product frame 32 can be directly guided to the second gas leading path 38. A space is formed on the lower side of the product frame 32, so that the pressure medium gas blown out of the gas flow amplification means 33 can be guided radially-outward along the lower surface of the product frame 32. This space communicates with a gap 55 formed along the vertical direction between the heating means 7 and the partition plate 8 so that the pressure medium gas blown out of the gas flow amplification means 33 can be guided to the gap 55.

When the inside of the hot zone is cooled in the HIP device 1 of the fourth embodiment, the cooled pressure medium gas blown to the lower side of the product frame 32 from the gas flow amplification means 33 flows radially-outward along the lower surface of the product frame 32, and is branched to an upward flow and a downward flow when it enters the gap 55. The pressure medium gas flowing downwardly is returned to the gas flow amplification means 33 through the second gas leading path 38, while the pressure medium gas flowing upwardly is branched again after it reaches the upper end of the gap 55, introduced into the hot zone through the gap 34, and guided downwardly within the hot zone. The pressure medium gas which is guided to the second gas leading path 38 through the gas circulation pipe 54 is returned to the gas flow amplification means 33 via the second gas leading path 38.

When the pressure medium gas is guided downwardly within the hot zone in this way, the workpiece W and the inside of the hot zone storing the workpiece W can be efficiently cooled in a short time since the cooled low-temperature pressure medium gas is directly supplied to the hot zone from above.

The present invention is never limited to each of the above-mentioned embodiments, and can be properly changed in the shape, structure, material, combination or the like of each member without departing from the gist of the invention.

What is claimed is:

1. A hot isostatic pressing device for performing isostatic pressing treatment to a workpiece, comprising:

a high-pressure container for storing the workpiece;

a gas-impermeable inner casing disposed inside said high-pressure container so as to surround the workpiece;

a gas-impermeable outer casing disposed so as to surround said inner casing from the outside;

a heater provided inside said inner casing to form a hot zone around the workpiece, whereby isostatic pressing treatment may be performed on the workpiece using pressure medium gas within the hot zone and kept adiabatically by said inner casing and said outer casing;

first cooling means for forcedly circulating pressure medium gas by guiding pressure medium gas upwardly between said inner casing and said outer casing, to the outside of said outer casing through an upper part of said outer casing, downwardly along an inner circumferential surface of said high-pressure container to cool the pressure medium gas, and back to between said inner casing and said outer casing through a lower part of said outer casing; and second cooling means for circulating pressure medium gas by guiding pressure medium gas within the hot zone to the outside of the hot zone, and cooling the pressure medium gas by merging it with the pressure medium gas forcedly circulated by said first cooling means, and for returning a part of the cooled pressure medium gas into the hot zone through the lower side of the hot zone.

2. The hot isostatic pressing device according to claim 1, wherein said first cooling means includes:

an upper opening part formed in the upper part of said outer casing to guide the pressure medium gas between said inner casing and said outer casing to the outside of said outer casing;

a first valve provided between said high-pressure container and said outer casing to interrupt circulation of the pressure medium gas outflowing through said upper opening part and flowing between said high-pressure container and said outer casing;

a lower opening part formed in the lower part of said outer casing to return the cooled pressure medium gas to between said inner casing and said outer casing; and forced circulation means for forcedly circulating the pressure medium gas.

3. The hot isostatic pressing device according to claim 2, wherein said first valve is configured so as to open and close said upper opening part to interrupt the circulation of the pressure medium gas flowing between said high-pressure container and said outer casing.

4. The hot isostatic pressing device according to claim 1, wherein said second cooling means includes:

a first circulation port formed in said inner casing to merge the pressure medium gas contacted by said heater with the pressure medium gas circulated by said first cooling means;

a second circulation port formed on the lower side of said inner casing to return a part of the cooled pressure medium gas to the hot zone side; and a second valve for opening and closing said second circulation port.

5. The hot isostatic pressing device according to claim 4, wherein said second cooling means further includes a partition plate disposed between the workpiece and said heater so as to surround the workpiece, and is configured to return the pressure medium gas circulated by the second cooling means and guided to between said heater and said partition plate to the hot zone side while guiding the pressure medium gas guided to between said inner casing and said heater downwardly to said first circulation port.

6. The hot isostatic pressing device according to claim 5, wherein said second cooling means further includes gas flow amplification means for mixing the pressure medium gas guided to between said heater and said partition plate with the cooled pressure medium gas guided through said second circulation port in a predetermined mixing ratio and blowing the mixed pressure medium gas into the hot zone.

7. The hot isostatic pressing device according to claim 1, wherein said first cooling means includes:

an upper opening part formed in an upper part of said outer casing to guide the pressure medium gas between said inner casing and said outer casing to the outside of said outer casing;

a lower opening part formed in a lower part of said outer casing to return the cooled pressure medium gas to between said inner casing and said outer casing;

a first valve provided at said upper opening part to interrupt circulation of the pressure medium gas flowing between said high-pressure container and said outer casing; and casing-side forced circulation means provided at said lower opening part to forcedly return the cooled pressure medium gas to between said inner casing and said outer casing.

8. The hot isostatic pressing device according to claim 1, wherein said first cooling means includes:

an upper opening part formed in an upper part of said outer casing to guide the pressure medium gas between said inner casing and said outer casing to the outside of said outer casing;

a lower opening part formed in a lower part of said outer casing to return the cooled pressure medium gas to between said inner casing and said outer casing;

a first valve provided at said lower opening part to interrupt circulation of the pressure medium gas flowing between said high-pressure container and said outer casing; and casing-side forced circulation means provided at said upper opening part to forcedly return the cooled pressure medium gas to between said inner casing and said outer casing.

9. The hot isostatic pressing device according to claim 1, wherein said second cooling means includes:

a first circulation port formed in said inner casing to merge the pressure medium gas contacted by said heater with the pressure medium gas circulated by said first cooling means;

a second circulation port formed on the lower side of said inner casing to return a part of the cooled pressure medium gas to the hot zone side; and hot zone-side forced circulation means provided at said second circulation port to forcedly return the cooled pressure medium gas to the hot zone side through said second circulation port.

10. The hot isostatic pressing device according to claim 9, wherein said second cooling means further includes a partition plate disposed between the workpiece and said heater so as to surround the workpiece, and configured to return the pressure medium gas circulated by the second cooling means and guided to between said heater and said partition plate to the hot zone side and to send the pressure medium gas guided to between said inner casing and said heater to said first circulation port.

11. The hot isostatic pressing device according to claim 10, wherein said second cooling means further includes a gas flow amplification means for mixing the pressure medium gas guided to between said heater and said partition plate with the cooled pressure medium gas guided through said second circulation port in a predetermined mixing ratio and blowing the mixed pressure medium gas into the hot zone.

12. A hot isostatic pressing device for performing isostatic pressing treatment to a workpiece, comprising:

a high-pressure container for storing the workpiece;

a gas-impermeable inner casing disposed inside said high-pressure container so as to surround the workpiece;

a gas-impermeable outer casing disposed so as to surround said inner casing from the outside; and a heater provided inside said inner casing to form a hot zone around the workpiece, whereby isostatic pressing treatment may be performed on the workpiece using pressure medium gas within the hot zone and kept adiabatically by said inner casing and said outer casing;

an upper opening part formed in an upper part of said outer casing to guide pressure medium gas between said inner casing and said outer casing to the outside of said outer casing;

a first valve for interrupting circulation of the pressure medium gas guided to the outside through said upper opening part and formed between said high-pressure container and said outer casing;

a lower opening part formed in a lower part of said outer casing to return the pressure medium gas cooled by contacting with an inner circumferential surface of said high-pressure container to between said inner casing and said outer casing;

a first circulation port for merging downwardly guided pressure medium gas in the hot zone with the pressure medium gas circulating between said inner casing and said outer casing;

a second circulation port formed on the lower side of said inner casing to return a part of the cooled pressure medium gas to the hot zone side; and a second valve for selectively permitting the cooled pressure medium gas into the hot zone to cool the hot zone by opening and closing said second circulation port.

* * * * *